(12) United States Patent
Kaneko

(10) Patent No.: US 6,504,588 B1
(45) Date of Patent: Jan. 7, 2003

(54) REFLECTION-TYPE COLOR LIQUID CRYSTAL DISPLAY DEVICE HAVING ABSORBING MEMBER CONTAINING FLUORESCENT MATERIAL

(75) Inventor: Yasushi Kaneko, Sayama (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/446,618

(22) PCT Filed: Apr. 28, 1999

(86) PCT No.: PCT/JP99/02296
§ 371 (c)(1),
(2), (4) Date: Dec. 27, 1999

(87) PCT Pub. No.: WO99/56170
PCT Pub. Date: Nov. 4, 1999

(30) Foreign Application Priority Data

Apr. 28, 1998 (JP) .......................................... 10-118476
Jul. 29, 1998 (JP) .......................................... 10-213586

(51) Int. Cl.[7] .............................................. G02F 1/335
(52) U.S. Cl. .......................................... 349/71; 349/104
(58) Field of Search ................................ 349/117, 113, 349/104, 98, 194, 71

(56) References Cited

U.S. PATENT DOCUMENTS

| | | | |
|---|---|---|---|
| 5,555,114 A | | 9/1996 | Narita et al. .................. 359/65 |
| 5,982,465 A | * | 11/1999 | Saxena et al. .............. 349/119 |
| 6,008,871 A | * | 12/1999 | Okumura ..................... 349/61 |
| 6,124,971 A | * | 9/2000 | Ouderkirk et al. .......... 359/487 |
| 6,252,829 B1 | * | 6/2001 | Miyazawa et al. .......... 368/242 |
| 6,285,422 B1 | * | 9/2001 | Maeda et al. ................. 349/96 |

FOREIGN PATENT DOCUMENTS

| | | |
|---|---|---|
| EP | 0913721 A1 | 5/1999 |
| JP | 6-138436 | 5/1994 |
| JP | 7-281010 | 10/1995 |
| JP | 8-43787 | 2/1996 |
| JP | 08043787 | 2/1996 |
| JP | 8-220504 | 8/1996 |
| JP | 9-113725 | 5/1997 |
| JP | 9-251151 | 9/1997 |
| JP | 10-3078 | 1/1998 |
| WO | WO98/52094 | 11/1998 |

* cited by examiner

Primary Examiner—Kenneth Parker
(74) Attorney, Agent, or Firm—Armstrong, Westerman & Hattori, LLP

(57) ABSTRACT

A reflection-type color liquid crystal display device comprises: an STN liquid crystal cell (20) having nematic liquid crystal (6), which is aligned at a twist angle of 180° to 270°, sandwiched between a transparent first substrate (1) having first electrodes (3) and a transparent second substrate (2) having second electrodes (4), in which the first substrate or the second substrate is provided with a color filter (7) of a plurality of colors; an absorption-type polarizing film (11) placed on the visible side of the second substrate (2) over a retardation film (12); and a diffusing layer (13), a reflection-type polarizing film (14), and a light absorbing layer (15) arranged in order on the other side of the visible side of the first substrate (1). Accordingly, a bright color display with high contrast and excellent colors can be realized.

32 Claims, 9 Drawing Sheets

REFLECTION-TYPE COLOR LIQUID CRYSTAL DISPLAY DEVICE HAVING ABSORBING MEMBER CONTAINING FLUORESCENT MATERIAL

TECHNICAL FIELD

The present invention relates to a reflection-type (transflective) color liquid crystal display device, more specifically, to a structure of a reflection-type color liquid crystal display device containing a color filter therein, capable of a multicolor display.

BACKGROUND TECHNOLOGY

A reflection-type liquid crystal display device for performing a monochrome display using a TN (twisted nematic) liquid crystal cell or an STN (super twisted nematic) liquid crystal cell, is mainly used as a conventional reflection-type liquid crystal display device. However, in recent years, there has been a growing demand to display colors and reflection-type color liquid crystal display devices containing color filters therein have been vigorously developed.

The reflection-type liquid crystal display devices containing color filters therein are broadly classified into the following three examples.

The first conventional example uses a liquid crystal mode without a polarizing film. There is a guest-host LCD in which a black dye is mixed in a liquid crystal material, a polymer-dispersion LCD in which a liquid crystal material is dispersed in a polymer and so on. Since none of them uses a polarizing film, they are excellent in brightness but low in contrast, thus they have not been realized for practical use yet.

The second conventional example is a reflection-type liquid crystal display device using one polarizing film and containing a reflector inside a liquid crystal display device. Moreover, this example is divided into two types. One type uses a self-contained reflector of a mirror surface and has a diffusing layer provided on the surface thereof, and the other uses a reflector with scattering properties. Since both types use only one polarizing film, they are also excellent in brightness but low in contrast.

In the type using a self-contained reflector of a mirror surface, though it is bright in a direction of regular reflection of incident light, it becomes abruptly darker at other angles, that is, the viewing angle characteristic thereof is quite poor. In the other type using a reflector with scattering properties, it is difficult to control scattering properties and the fabricating process becomes complicated.

The third conventional example is a liquid crystal display device using two polarizing films and having a color filter provided in a typical monochrome liquid crystal display device. Since this example uses two polarizing films, it is excellent in contrast, but it has a disadvantage of a dark display. However, a reflection-type polarizing film, which has a transmission axis and a reflection axis to reflect the light linearly polarized in a direction of the reflection axis, is used for a lower polarizing film, thereby brightness is improved and this reflection-type liquid crystal display device is considered for practical use. The conventional example using a reflection-type polarizing film is disclosed in, for example, Japan Patent Laid-open No. Hei 10-3078.

However, in this Patent Bulletin, disclosed is a TN-mode reflection-type display device mainly using active matrix (drive) elements. A liquid crystal display device using active matrix (drive) elements is excellent in contrast but the brightness thereof is lowered due to lowering of an aperture ratio. In contrast to the above, a passive matrix liquid crystal display device without active matrix (drive) elements is superior in brightness because of its higher aperture ratio.

Moreover, it is disclosed that a reflection-type color liquid crystal display device can be provided by using an STN liquid crystal cell having a twist angle of 90° or more, a retardation film and a reflection-type polarizing film in the aforesaid Patent Bulletin. However, the liquid crystal display device described in the embodiments is a typical monochrome display STN liquid crystal display device provided with a color filter.

A typical monochrome display STN liquid crystal display device is a normally-white-type for obtaining a white display during no applied voltage. For enhancing whiteness more than brightness, the transmittance on a long wavelength side is suppressed, thus the average transmittance is lowered. Moreover, a black display of ON state is slightly bluish black, therefore the performance as a shutter is not excellent.

In other words, the reflection-type color liquid crystal display device that is a typical monochrome display STN liquid crystal display device provided with a color filter, performs a dark display due to lowering of brightness, more than that, since the shutter performance varies from color to color, excellent colors can not be obtained.

DISCLOSURE OF THE INVENTION

The present invention is made to solve the aforesaid disadvantages, and its object is to provide a reflection-type color liquid crystal display device with a bright display, high contrast and excellent colors.

In order to achieve the above object, the reflection-type color liquid crystal display device according to the present invention comprises: an STN liquid crystal cell having nematic liquid crystal, which is aligned at a twist angle of 180° to 270°, sandwiched between a transparent first substrate having first electrodes and a transparent second substrate having second electrodes, in which the first electrodes and the second electrodes opposing to each other across the nematic liquid crystal, and the first substrate or the second substrate is provided with a color filter of a plurality of colors; an absorption-type polarizing film placed on the visible side of the second substrate and having a transmission axis and an absorption axis; a retardation film placed between the absorption-type polarizing film and the second substrate; and a diffusing layer, a reflection-type polarizing film having a transmission axis and a reflection axis, and a light absorbing layer absorbing almost all incident light, which are arranged in order on the other side of the visible side of the first substrate.

Moreover, by using the so-called Z-type retardation film which satisfies conditions of nx>nz>ny, where nx is the refractive index in a stretching direction of the retardation film, ny is the refractive index in a direction orthogonal to the stretching direction, and nz is the refractive index in a thickness direction, the viewing angle is improved and incident light from the surroundings is effectively utilized, thus a bright display can be obtained.

Alternatively, a typical retardation film which satisfies conditions of nx>ny=nz, where nx is the refractive index in a stretching direction of the retardation film, ny is the refractive index in a direction orthogonal to the stretching direction, and nz is the refractive index in a thickness direction, may be used.

Furthermore, in the above either case, it is preferable that a value of a difference ΔR=Rs−Rf ranges from 0.27 µm to 0.35 µm, where Rs is a Δnd which is the product of a difference Δn in the birefringence of nematic liquid crystal of the STN liquid crystal cell and a cell gap d, and Rf is a retardation value of the retardation film, thereby the average transmittance of white becomes higher and an excellent black characteristic can also be obtained.

Even if a twisted retardation film is used in place of the aforesaid retardation film in the reflection-type color liquid crystal display device, a white characteristic with high transmittance, an excellent black characteristic, and a wide viewing angle characteristic can be obtained.

In the above case, it is preferable that a value of a difference ΔT=|Ts|−|Tc| in absolute value of each twist angle ranges from 10° to 30° and a value of ΔR=Rs−Rc ranges from 0.15 µm to 0.30 µm, where Rs is a Δnd which is the product of a difference Δn in the birefringence of nematic liquid crystal of the STN liquid crystal cell and a cell gap d, Ts is a twist angle of the STN liquid crystal cell, Rc is a Δnd value of the twisted retardation film, and Tc is a twist angle of the twisted retardation film.

Additionally, it is preferable that the color filter has a maximum transmittance of 80% or more and a minimum transmittance of 20% to 50% due to its spectral characteristics.

The thickness of the first substrate of the STN liquid crystal cell is preferably thinner than that of the second substrate.

Furthermore, in place of the light absorbing layer, a translucent-type light absorbing layer through which part of incident light passes, and a backlight may be arranged outside the reflection-type polarizing film in the aforesaid reflection-type color liquid crystal display device. Thereby, a bright color display can be obtained even in a dark circumstance such as at night by lighting of the backlight.

Also in this case, it is preferable to satisfy conditions of nx>nz>ny, where nx is the refractive index in a stretching direction of the retardation film in use, ny is the refractive index in a direction orthogonal to the stretching direction, and nz is the refractive index in a thickness direction.

Alternatively, a twisted retardation film may be used in place of the retardation film.

The translucent-type light absorbing layer is preferably a plastic film dyed with a black dye or a black pigment to have a transmittance of 20% to 60%.

Alternatively, the translucent-type light absorbing layer may be formed by printing with black ink to have a transmittance of 20% to 60% on the rear face of the reflection-type polarizing film or on the front face of the backlight.

BEST MODE FOR CARRYING OUT THE INVENTION

Hereinafter, in order to explain the present invention in detail, the best mode of the present invention will be described with reference to the drawings.

First Embodiment

First, the first embodiment of a reflection-type color liquid crystal display device according to the present invention will be described with FIG. 1 through FIG. 3 and FIG. 8 through FIG. 10.

Figure 1:
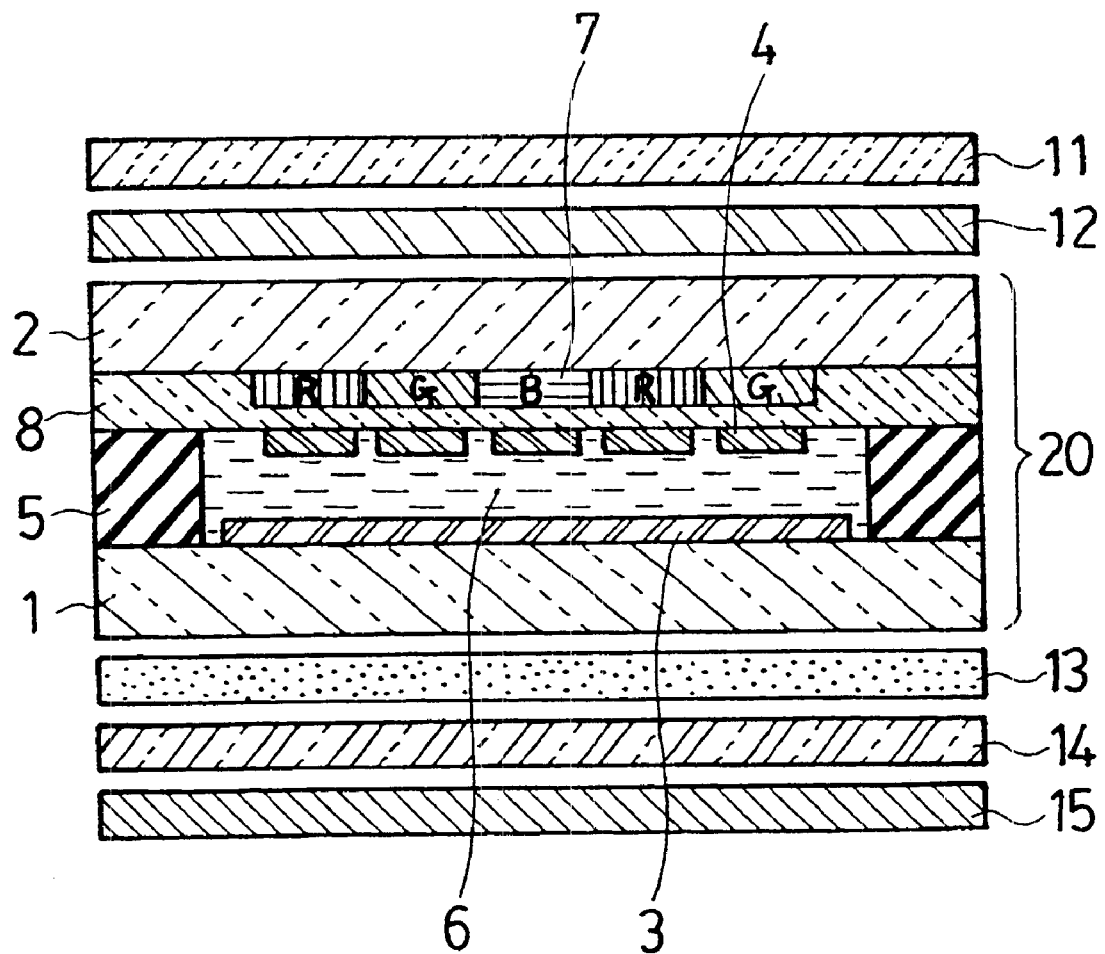
FIG. 1 is a schematic sectional view showing the structure of a first embodiment of a reflection-type color liquid crystal display device according to the present invention.
Figure 2:
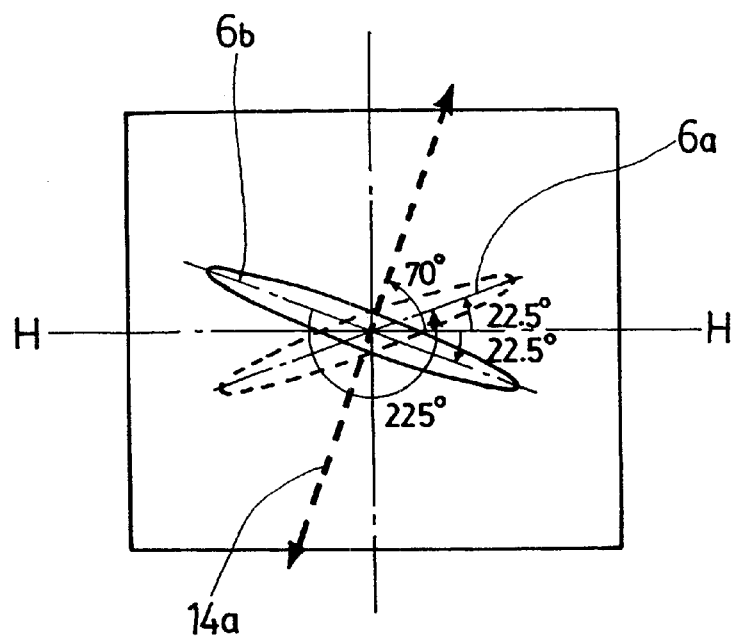
FIG. 2 is an explanatory view of the positional relation between an STN liquid crystal cell and a reflection-type polarizing film in the reflection-type color liquid crystal display device shown in FIG. 1.
Figure 3:
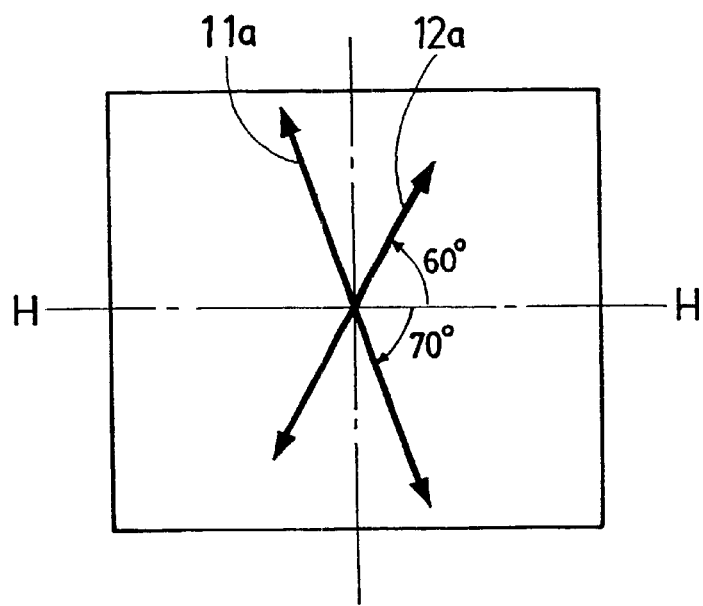
FIG. 3 is also an explanatory view of the positional relation between an absorption-type polarizing film and a retardation film.

FIG. 1 is a schematic sectional view showing the structure of the reflection-type color liquid crystal display device. FIG. 2 is a view for explaining the positional relation between an STN liquid crystal cell and a reflection-type polarizing film. FIG. 3 is also a view for explaining the positional relation between an absorption-type polarizing film and a retardation film.

In the reflection-type color liquid crystal display device of the first embodiment, as shown in FIG. 1, an STN liquid crystal cell 20 is formed by having nematic liquid crystal 6, which is aligned at a twist angle of 225°, sandwiched between a transparent first substrate 1 and a transparent second substrate 2 each of which is made of a glass plate with a thickness of 0.5 mm.

On the inner surface of the first substrate 1, transparent first electrodes 3 made of indium tin oxide (hereinafter referred to as "ITO") are formed in stripes at spaced intervals in a direction orthogonal to the paper surface. On the inner surface of the second substrate 2, a color filter 7 in which three color filters of red filters R, green filters G, and blue filters B having a thickness of 0.4 $\mu$m formed by the pigment dispersion method are provided in a given order, and a protection film 8 with a thickness of 2 $\mu$m made of an acrylic material for covering the color filter 7, are provided. On the protection film 8, transparent second electrodes 4 made of ITO are formed in stripes at spaced intervals in a lateral direction in the drawing. The first substrate 1 and the second substrate 2 are bonded to each other with a fixed space therebetween using a sealant 5.

On the visible side (the upper side in the drawing) of the second substrate 2 of the STN liquid crystal cell 20, an absorption-type polarizing film (hereinafter referred to as only "a polarizing film") 11 having a transmission axis and an absorption axis, which is a typical polarizing film, is placed, and a retardation film 12 is placed between the polarizing film 11 and the second substrate 2.

On the other side (the lower side in the drawing) of the visible side of the first substrate 1, a diffusing layer 13, a reflection-type polarizing film 14, and a light absorbing layer 15 which absorbs almost all incident light, are arranged in order.

A retardation value R of the retardation film 12 is, for example, R=0.55 $\mu$m, and the polarizing film 11 disposed outside the retardation film 12 preferably has a transmittance of about 46%.

Now, the reflection-type polarizing film 14 will be described. A typical polarizing film is an absorption-type polarizing film having a transmission axis for transmitting light and an absorption axis for absorbing light. However, the reflection-type polarizing film 14 has a transmission axis and a reflection axis orthogonal to the transmission axis so as to transmit the light linearly polarized in a direction of the transmission axis but to regularly reflect the light linearly polarized in a direction of the reflection axis. By placing a black printed layer or a black film outside the reflection-type polarizing film 14 as the light absorbing layer 15, the linearly polarized light in a direction of the transmission axis performs a black display, and the linearly polarized light in a direction of the reflection axis performs a white display. Moreover, a bright white display can be obtained by virtue of the high reflection efficiency.

Moreover, since the surface of the reflection-type polarizing film 14 is a mirror surface, it is bright in a direction of regular reflection of incident light, but it becomes dark at other angles, thus the viewing angle characteristic thereof is poor. To improve the viewing angle characteristic, the diffusing layer 13 is provided on the surface side of the reflection-type polarizing film 14.

This embodiment employs a reflection-type polarizing film which is integrally provided with a diffusing layer and a light absorbing layer. The diffusing layer 13 is provided with a diffusing adhesive layer in which minute particles are dispersed in an adhesive, and the light absorbing layer 15 is given by black printing on the rear face thereof. As such a reflection-type polarizing film, for example, R-DF-B (trade name) manufactured by Sumitomo 3M Ltd. is used. The reflection-type polarizing film consists of multi-layered thin films with different reflective indexes. In addition to this, a polarizing film consisting of a cholesteric liquid crystal polymer sandwiched between $\lambda$/4 (quarter wavelength) films or one utilizing a hologram may be used.

The retardation film 12 is a film made of stretched polycarbonate with a thickness of about 70 $\mu$m having relations of nx>nz>ny, where nx is the refractive index in a stretching direction, ny is the refractive index in a direction orthogonal to the stretching direction, and nz is the refractive index in a thickness direction. The above film is the so-called Z-type retardation film and integrated with the polarizing film 11 with acrylic adhesives. The Z-type retardation film has little change in retardation when seen from a tilted viewing angle, consequently, the viewing angle characteristic of the liquid crystal display device can be improved.

Next, the relation between the thickness of the first substrate 1 and colors will be described. The color filter 7 is placed inside the second substrate 2, and incident light passes through the polarizing film 11, the retardation film 12, the second substrate 2, the color filter 7, and the nematic liquid crystal 6. Then, after passing through the first substrate 1, the incident light is reflected by the reflection-type polarizing film 14 and returns to transmit the first substrate 1, the nematic liquid crystal 6, the color filter 7, and finally the polarizing film 11 and reaches the observer's eye.

However, if the first substrate 1 is thick, a color of the color filter 7, through which the incident light from a slanting direction has passed when it is incident, differs from a color of the color filter 7 through which the incident light passes when it is reflected, resulting in that the chroma lowers due to color mixture. Accordingly, the thinner the first substrate 1 is, the less color mixture due to incident light in a slanting direction is, thereby obtaining excellent colors. Prototypes using first substrates having various thicknesses show that the first substrate having a thickness of 0.5 mm or less provides excellent colors. The thinner the first substrate 1 is, the more excellent the colors become. However, the workability deteriorates and the strength also lowers if the first substrate is too thin, therefore it is preferable to have a thickness of 0.1 mm or more. In this embodiment, a glass plate having a thickness of 0.5 mm is used as both the first substrate 1 and the second substrate 2.

The color filter 7 is preferably as high in maximum transmittance as possible to improve brightness, thus the color filter is made thin in thickness or the concentration of pigments is made low. However, if the thickness is made too thin or the concentration of pigments is made too low, the minimum transmittance becomes 50% or more, resulting in that the chroma is extremely lowered. Prototypes with color filters having various thicknesses have been tested, and it is consequently found that the maximum transmittance due to spectral characteristic of each color is preferably 80% or more and most preferably 90% or more.

Figure 8:
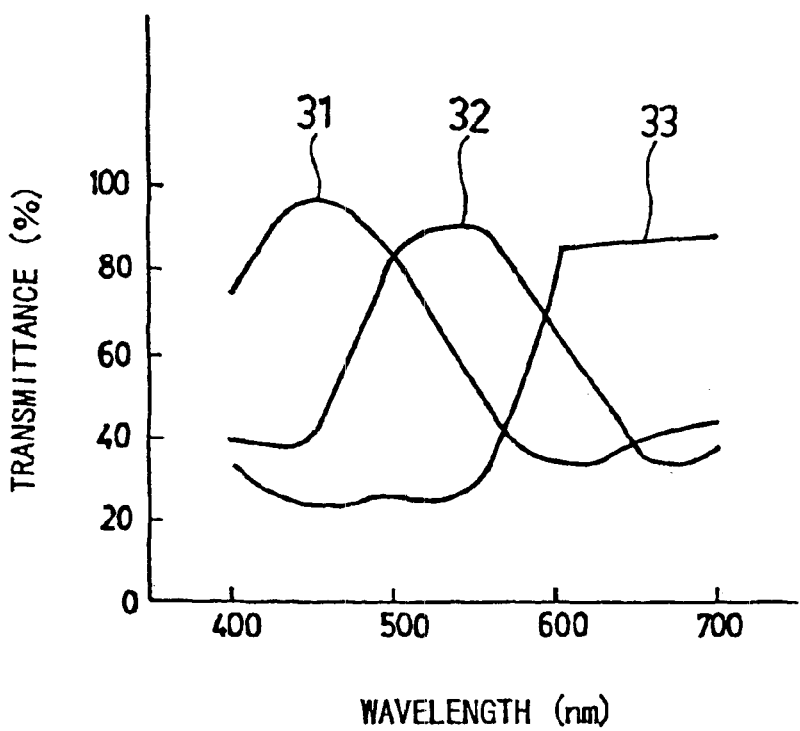
FIG. 8 is a curved-line graph showing spectral characteristics of a color filter used in the reflection-type color liquid crystal display device of each embodiment of the present invention.

On the other hand, the minimum transmittance due to the spectral characteristic of each color is preferably between 20% and 50% and most preferably 40%, giving priority to chroma and brightness. The spectral characteristics of the color filter 7 used in this embodiment are shown in FIG. 8. A curved line 31 shows the spectral characteristic of the blue filter B, a curved line 32 shows that of the green filter G, and a curved line 33 shows that of the red filter R respectively. Any color filter has a maximum transmittance of about 90% and a minimum transmittance of about 40%. The transmittances of the first electrodes 3 and the second electrodes 4 made of ITO are also important in terms of brightness. The lower the sheet resistance value of ITO is, the thicker the film thickness becomes and the lower the transmittance becomes.

Figure 9:
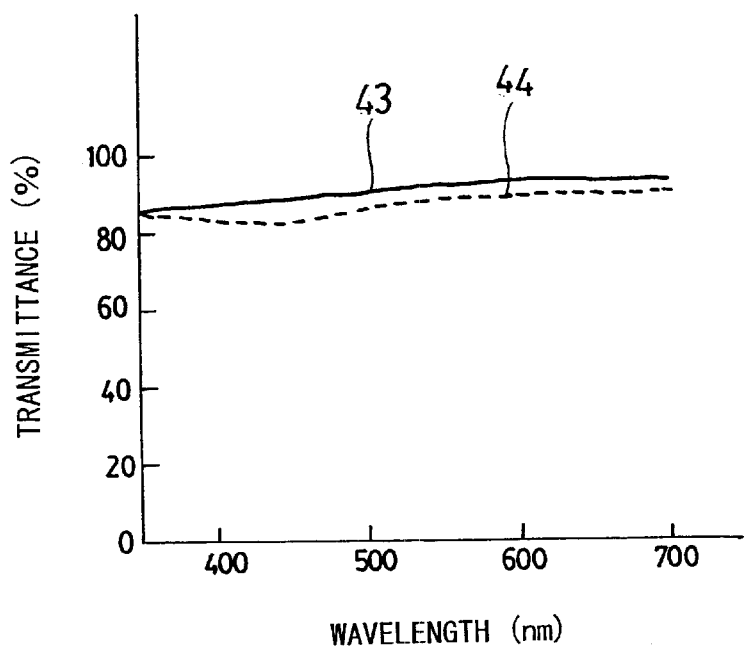
FIG. 9 is a curved-line graph showing transmittance characteristics of ITO used in the reflection-type color liquid crystal display device of each embodiment of the present invention.

The transmittance characteristics of the ITO used in this embodiment are shown in FIG. 9. Since the first electrodes 3 are applied with a data signal, ITO having little influence due to cross-talk and a sheet resistance of 100 ohms is used for them. The transmittance of the ITO is shown by a solid curved line 43. The average transmittance is about 92%.

Since the second electrodes 4 are applied with a scanning signal, ITO having a sheet resistance of 10 ohms is used for them in order to reduce cross-talk. The transmittance of the ITO is shown by a dotted curved line 44. The average transmittance becomes about 89%, that is slightly low, but the brightness can be improved sufficiently by employing transparent electrodes having a transmittance of 90% or more on at least one substrate as this embodiment.

Next, the positional relations between components in this reflection-type color liquid crystal display device will be described using FIG. 2 and FIG. 3.

On the inner surfaces of the first electrodes 3 and the second electrodes 4, alignment layers (not shown) are respectively formed. As shown in FIG. 2, the inside of the first substrate 1 is subjected to a rubbing treatment in a direction of upward to the right at a 22.5° angle with respect to a horizontal axis H—H, whereby a lower molecular alignment direction 6a of liquid crystal is disposed at a 22.5° angle in a counterclockwise direction. The inside of the second substrate 2 is subjected to a rubbing treatment in a direction of downward to the right at a 22.5° angle, whereby an upper molecular alignment direction 6b of liquid crystal is disposed at a 22.5° angle in a clockwise direction. A so-called "chiral" substance, which is an optical rotatory material, is added to the nematic liquid crystal 6 having a viscosity of 20 cp and the twisting pitch P thereof is adjusted to 11 μm, thus forming the STN liquid crystal cell 20 twisted clockwise to a 225° angle.

A difference Δn in birefringence of the nematic liquid crystal 6 in use is set to be 0.15 and a cell gap d which is a gap between the first substrate 1 and the second substrate 2 is set to be 5.6 μm. Accordingly, Rs, which is a Δnd value of the STN liquid crystal cell 20, represented by the product of the difference Δn in the birefringence of the nematic liquid crystal 6 and the cell gap d, is 0.84 μm. Since a retardation value Rf of the retardation film 12 is 0.55 μm, the difference ΔR therebetween is expressed by ΔR=Rs−Rc=0.29.

A transmission axis 14a of the reflection-type polarizing film 14 is directed at a 70° angle in a counterclockwise direction with respect to a horizontal axis H—H. A transmission axis 11a of the polarizing film 11, as shown in FIG. 3, is directed at a 70° angle in a clockwise direction with respect to the horizontal axis H—H and a stretching axis 12a of the retardation film 12 is directed at a 60° angle in a counterclockwise direction with respect to the horizontal axis H—H.

The reflection-type color liquid crystal display device of this embodiment structured as above goes into a normally-white mode displaying white where no voltage is applied (OFF), in which light is incident also through between pixels (portions at which first electrodes 3 and second electrodes 4 intersect), so that bright display can be obtained. Applying voltage (ON) between the first electrodes 3 and the second electrodes 4, molecules of the nematic liquid crystal 6 rise, resulting in a black display. The combination ON and OFF for each color enables a full-color display.

Figure 10:
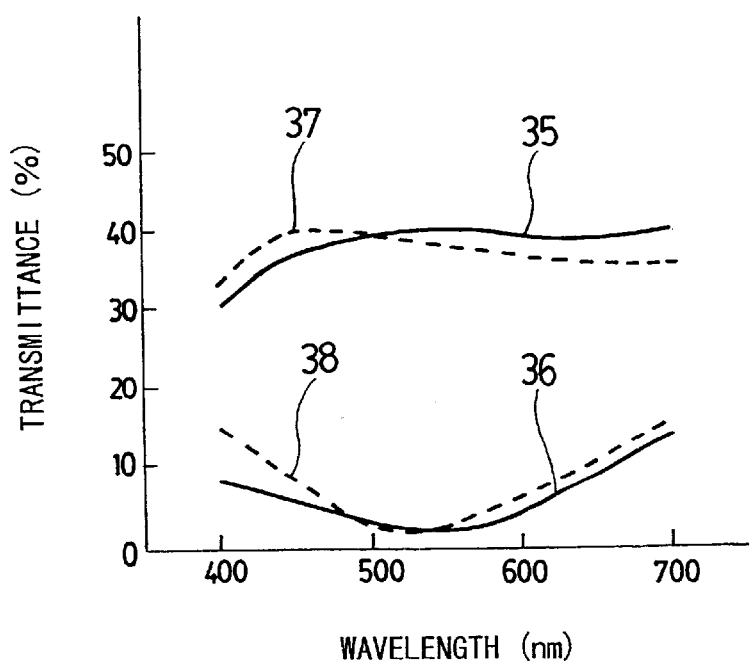
FIG. 10 is a curved-line graph showing transmittance characteristics where the color filter is removed from the reflection-type color liquid crystal display device of each embodiment of the present invention.

The spectral characteristics of ON and OFF where the color filter 7 is taken out of the reflection-type color liquid crystal display device are shown in FIG. 10. A solid curved line 35 shows the spectral characteristic of OFF displaying white. A solid curved line 36 shows the spectral characteristic of ON displaying black when the reflection-type color liquid crystal display device is driven at a frame frequency of 120 Hz. Incidentally, as comparison examples, a dotted curved line 37 shows the spectral characteristic of OFF in the conventional reflection-type liquid crystal display device where ΔR=0.26 is set and a dotted curved line 38 shows the spectral characteristic of ON thereof.

The conventional example is a monochrome reflection-type liquid crystal display device and displays bluish white by slightly suppressing the transmittance of a long wavelength in order to enhance whiteness during OFF as shown by the curved line 37. On the other hand, the liquid crystal display device of this embodiment is designed in such a manner that it displays somewhat yellowish during OFF as shown by the curved line 35 but the average transmittance thereof becomes highest.

The conventional example displays somewhat bluish black during ON as shown by the curved line 38. On the other hand, it is found that the liquid crystal display device of this embodiment can obtain an excellent black characteristic that can uniformly shut the whole wavelength region during ON as shown by the curved line 36. An excellent characteristic can be obtained in a range of ΔR=0.27 to 0.35, while it is not preferable for ΔR to be 0.35 or more because white inclines to yellow too much and black becomes reddish.

Moreover, the Z-type retardation film having relations of nx>nz>ny is used as the retardation film 12, thereby the viewing angle characteristic of the liquid crystal display device can be improved. The improvement of the viewing angle characteristic allows light to be incident from various directions, consequently, the display becomes bright and a more excellent reflection-type color liquid crystal display device can be obtained.

When the response speed of the STN liquid crystal display device 20 is fast, the contrast can be improved by boosting the frame frequency that is a driving frequency. However, if the frame frequency is boosted too high, cross-talk occurs, therefore it is preferably in a range from 100 Hz to 200 Hz. This embodiment is driven by writing a video signal of 60 Hz once in memory and reading twice the speed thereof at a frame frequency of 120 Hz.

In this embodiment, the reflection-type color liquid crystal display device comprises the bright polarizing film 11, the Z-type retardation film 12, the STN liquid crystal cell 20, and the reflection-type polarizing film 14, and the brightness and shutter performance thereof are optimized. It is driven at a frame frequency ranging from 100 Hz to 200 Hz, thereby providing a reflection-type color liquid crystal display device with high contrast, high brightness and high chroma.

Modification of the First Embodiment

In the aforesaid first embodiment, the STN liquid crystal cell 20 with Rs=0.84 μm at a twist angle of 225° is used as an STN liquid crystal cell. However, even if an STN liquid crystal cell with Rs=0.7 to 1.0 at a twist angle of 180° to 270° is used, the similar reflection-type color liquid crystal display device can be obtained by optimizing arrangement-angles of the polarizing film 11, the retardation film 12, and the reflection-type polarizing film 14.

The color filter consisting of three colors of red, green, and blue is used as the color filter 7 in this embodiment. Moreover, even if a color filter consisting of three colors of cyan, yellow, and magenta is used, a bright color display can be realized. Furthermore, a color filter of a plurality of colors such as two colors or four or more colors can also be employed depending on the use.

In this embodiment, the polarizing film 11 having a transmittance of 46% is used. It is preferable to use a polarizing film having a transmittance of 45% or more and a polarization degree of 95% or more in order to obtain excellent brightness. It is, of course, possible to use even a polarizing film having a transmittance of less than 45%, though the display becomes somewhat dark.

Second Embodiment

Figure 5:
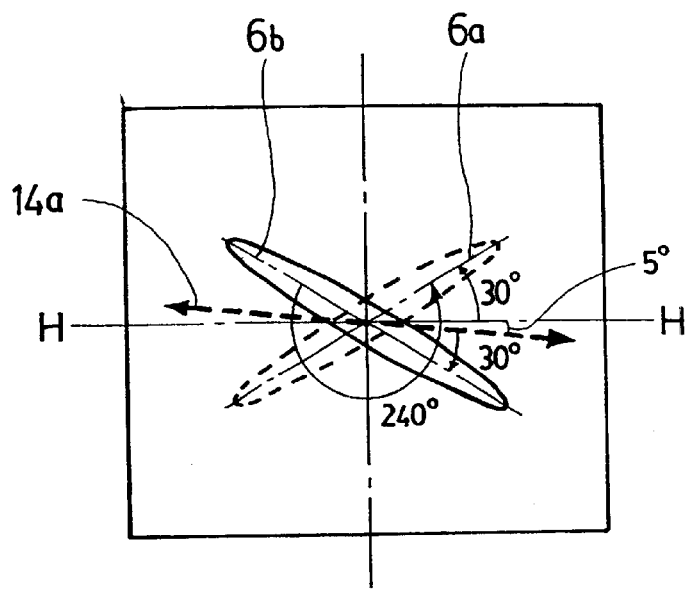
FIG. 5 is an explanatory view of the positional relation between an STN liquid crystal cell and a reflection-type polarizing film in the reflection-type color liquid crystal display device shown in FIG. 4.
Figure 6:
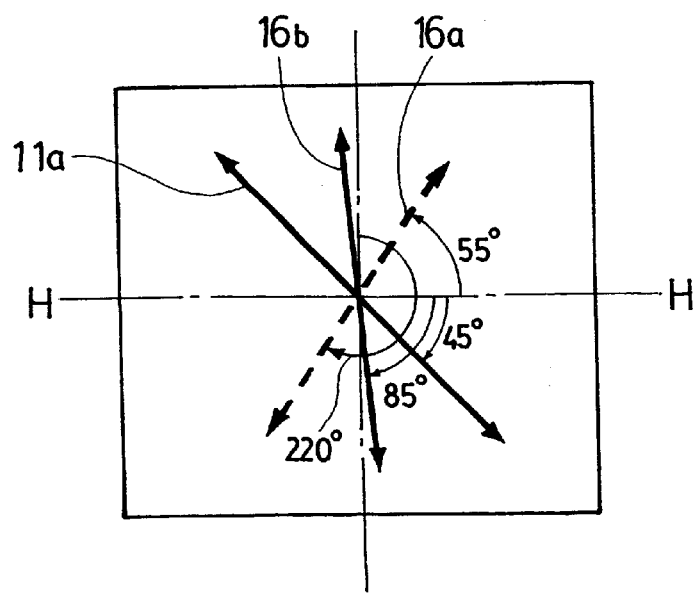
FIG. 6 is also an explanatory view of the positional relation between an absorption-type polarizing film and a twisted retardation film.

Next, the second embodiment of the reflection-type color liquid crystal display device according to the present invention will be described with reference to FIG. 4 to FIG. 6.

Figure 4:
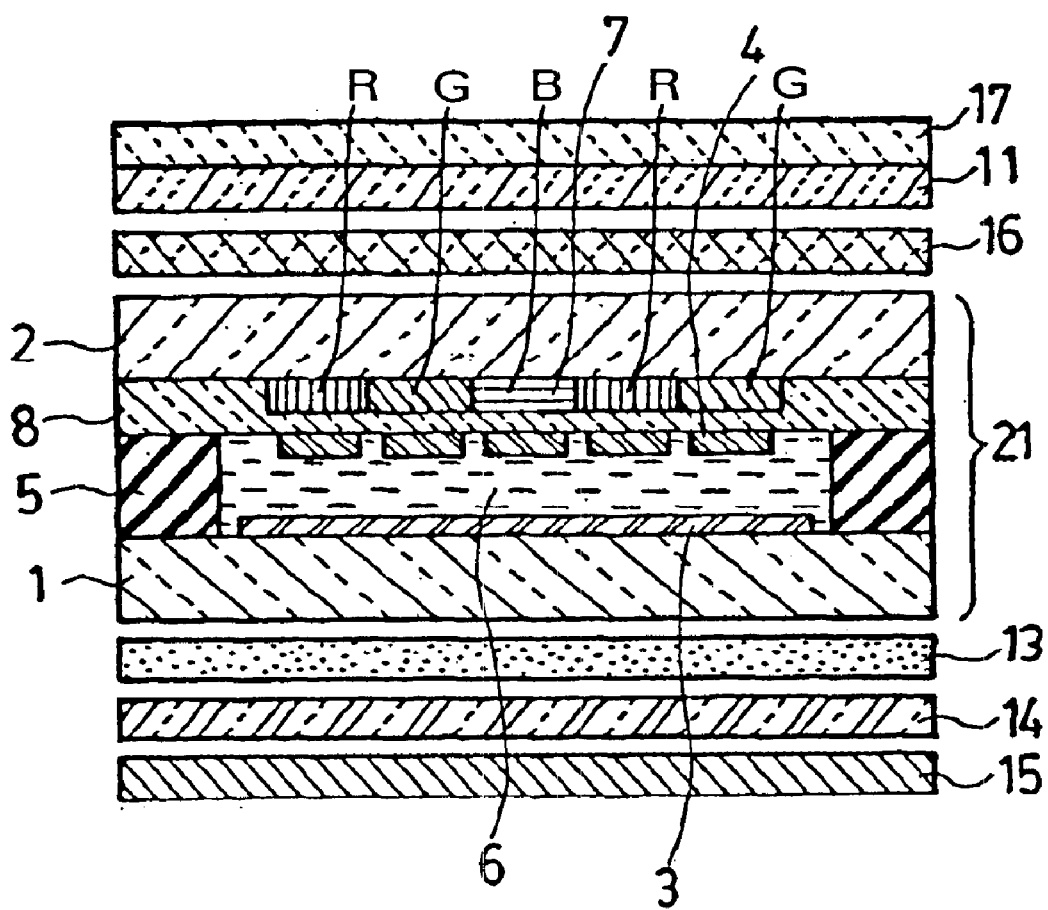
FIG. 4 is a schematic sectional view showing the structure of a second embodiment of the reflection-type color liquid crystal display device according to the present invention.

FIG. 4 is a sectional view, similar to FIG. 1, showing the structure of the reflection-type color liquid crystal display device. FIG. 5 is a view for explaining the positional relation between an STN liquid crystal cell and a reflection-type polarizing film. FIG. 6 is a view for explaining the positional relation between a polarizing film and a twisted retardation film. The same reference numerals are given to components in these drawings corresponding to those in FIG. 1 through FIG. 3.

The reflection-type color liquid crystal display device of the second embodiment is the same as that of the first embodiment except for the points of: the use of a twisted retardation film 16 in place of the retardation film 12 in the first embodiment; the twist angle of an STN liquid crystal cell 21 different from that of the STN liquid crystal cell 20; and the provision of a non-reflection layer 17 on the surface of the polarizing film 11. The remaining structure in the second embodiment is the same as that in the first embodiment, therefore the description thereof will be omitted.

The STN liquid crystal cell 21 of this reflection-type color liquid crystal display device has nematic liquid crystal 6, which is aligned at a left-handed-twist angle of 240°, sandwiched between a first substrate 1 and a second substrate 2 as shown in FIG. 4.

On the visible side of the second substrate 2 of the STN liquid crystal cell 21, a polarizing film (an absorption-type polarizing film) 11, which has a transmittance of 46% and is provided with the non-reflection layer 17 on the surface thereof, is placed over the twisted retardation film 16. It is the same as in the first embodiment shown in FIG. 1 that a diffusing layer 13, a reflection-type polarizing film 14, and a light absorbing layer 15 are arranged in order on the other side (the outside) of the visible side of the first substrate 1.

The twisted retardation film 16 is a film that a liquid crystal high polymer having a twist is applied to triacetyl cellulose (TAC) film or polyethylene terephthalate (PET) film after an aligning treatment, made into liquid crystal state at a high temperature of about 150° C., and cooled rapidly to room temperature after adjusting the twist angle to fix the twisted state. The twisted retardation film 16 twisted right-handed and having a twist angle Tc of −220° and Rc, which is Δnd, of 0.61 μm is used in this embodiment.

The non-reflection layer 17 having several inorganic thin films evaporated thereon and a reflectance of about 0.5% is provided on the surface of the polarizing film 11, thereby the surface reflection by the polarizing film 11 is reduced so that the transmittance is improved, resulting in a bright display. Moreover, the light reflected by the surface of the polarizing film 11 is reduced, thereby the black level during ON lowers and the contrast improves, so that a reflection-type color liquid crystal display device with high brightness and high chroma can be obtained.

However, since evaporated film is expensive, non-reflection film of a coating-type, in which one to two layers of an organic material are coated, has been developed recently. Although the above non-reflection films have a reflectance of about 1%, which is a little high, they are low cost and can also be used similarly.

Next, the positional relations between components of this reflection-type color liquid crystal display device will be described using FIG. 5 and FIG. 6. On the surfaces of the first electrodes 3 and the second electrodes 4, alignment layers (not shown) are respectively formed. As shown in FIG. 5, the first substrate 1 is subjected to a rubbing treatment in a direction of upward to the right at a 30° angle with respect to a horizontal axis H—H, whereby a lower molecular alignment direction 6a of liquid crystal is disposed at a 30° angle in a counterclockwise direction. The second substrate 2 is subjected to a rubbing treatment in a direction downward to the right at a 30° angle, whereby an upper molecular alignment direction 6b of liquid crystal is disposed at a 30° angle in a clockwise direction.

A so-called "chiral" substance, which is an optical rotatory material, is added to the nematic liquid crystal 6 having a viscosity of 20 cp and the twisting pitch P thereof is adjusted to 11 μm, thus forming the STN liquid crystal cell 21 twisted at a 240° angle in a counterclockwise direction (left-handed).

A difference Δn in birefringence of the nematic liquid crystal 6 is set to be 0.15 and a cell gap d which is a gap between the first substrate 1 and the second substrate 2 is set to be 5.6 μm. Accordingly, Rs, which is a Δnd value of the STN liquid crystal cell 21, represented by the product of the difference Δn in the birefringence of the nematic liquid crystal 6 and the cell gap d, is 0.84 μm. Since a retardation value Rc of the twisted retardation film 16 is 0.61 μm, a difference ΔR therebetween is expressed by ΔR=Rs−Rc=0.23 μm.

When ΔR increases, white display inclines to yellow, and conversely, when ΔR is small, the screen becomes dark. Accordingly, a range of ΔR=0.15 μm to 0.30 μm is preferable.

A transmission axis 14a of the reflection-type polarizing film 14 is directed at a 5° angle in a clockwise direction with respect to a horizontal axis H—H. A transmission axis 11a of the polarizing film 11 is directed at a 45° angle in a counterclockwise direction with respect to a horizontal axis H—H as shown in FIG. 6. A lower molecular alignment direction 16a of the twisted retardation film 16 is directed at a 55° angle in a counterclockwise direction with respect to the horizontal axis H—H. An upper molecular alignment direction 16b is directed at an 85° angle in a clockwise direction. A twist angle Tc of the right-handed twisted liquid crystal cell 21 is 220° in a clockwise direction. A difference ΔT in absolute value of the twist angle is expressed by ΔT=Ts−Tc=20°.

The STN liquid crystal cell 21 can be corrected best when the absolute values of the twist angles thereof and the twisted retardation film 16 are equal, that is, ΔT=0, thereby excellent white can be obtained during OFF. However, it is not suitable for a reflection-type color liquid crystal display device because excellent black is not displayed during ON resulting in a low contrast. In order to display black excellent in shutter performance, it is preferable that ΔT=10° to 30°. Especially, when ΔT used in the reflection-type color liquid crystal display device of this embodiment is 20° (ΔT=20°), the transmittance of white during OFF is high and the shutter performance of black during ON is good, more than that, the viewing angle characteristic becomes excellent.

The reflection-type color liquid crystal display device of this embodiment structured as above goes into a normally white mode displaying white where no voltage is applied (OFF), in which light is incident also through between pixels, so that a bright display can be obtained. Applying voltage (ON) between first electrodes 3 and second electrodes 4, molecules of the nematic liquid crystal 6 rise, resulting in a black display. The combination ON and OFF for each color enables a full-color display.

In this embodiment, the reflection-type color liquid crystal display device comprises the bright polarizing film 11 provided with the non-reflection layer 17, the twisted retardation film 16, the STN liquid crystal cell 21, and the reflection-type polarizing film 14, and the brightness and shutter performance thereof are optimized. It is driven at a frame frequency ranging from 100 Hz to 200 Hz, thereby providing a reflection-type color liquid crystal display device with high contrast, high brightness and high chroma.

Modification of the Second Embodiment

In this embodiment, the STN liquid crystal cell 21 with Rs=0.84 μm at a twist angle of Ts=240° is used as an STN liquid crystal cell. However, even if it is a liquid crystal display device with Rs=0.7 to 1.0 at a twist angle of 180° to 270°, the similar reflection-type color liquid crystal display device can be realized by optimizing arrangement-angles of the polarizing film 11, the twisted retardation film 16, and the reflection-type polarizing film 14.

In this embodiment, the polarizing film 11 having a transmittance of 46% is used. It is preferable to use a polarizing film having a transmittance of 45% or more and a polarization degree of 95% or more in order to obtain excellent brightness. It is, of course, possible to use even a polarizing film having a transmittance of less than 45%, though the display becomes somewhat dark.

A liquid crystal polymer film, of which the twisted state is fixed at room temperature, is used as the twisted retardation film 16 in this embodiment. Moreover, a temperature-compensation-type twisted retardation film, in which part of liquid crystal molecules are only bound together into polymer molecules in a chain state and Rc thereof varies with temperature, is used, thereby obtaining a more excellent reflection-type color liquid crystal display device of which the brightness and contrast at high temperatures are improved.

Third Embodiment

Next, the third embodiment of the reflection-type color liquid crystal display device according to the present invention will be described with reference to FIG. 7.

Figure 7:
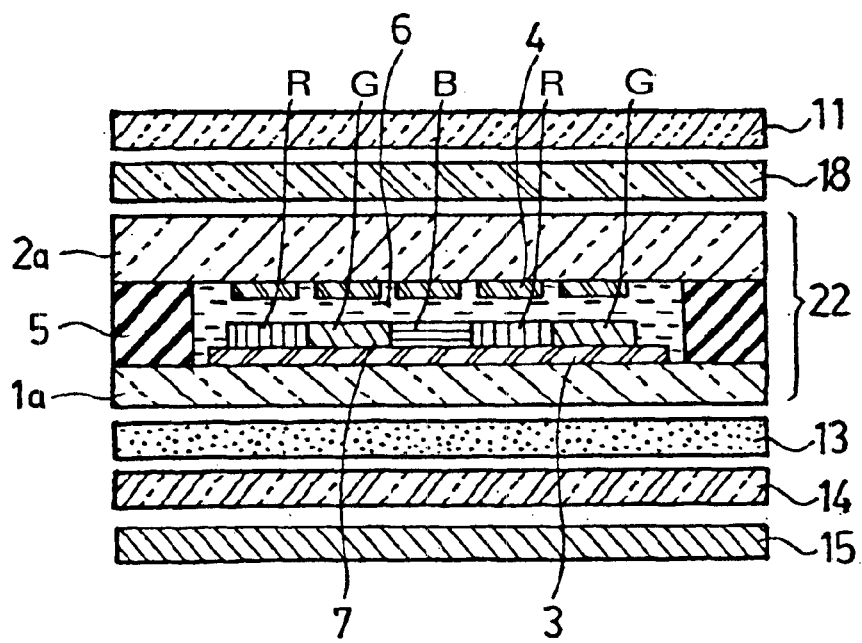
FIG. 7 is a schematic sectional view showing the structure of a third embodiment of the reflection-type color liquid crystal display device according to the present invention.

FIG. 7 is a sectional view, similar to FIG. 1, showing the structure of the reflection-type color liquid crystal display device. The same reference numerals are given to components in the drawing corresponding to those in FIG. 1, therefore the description thereof will be omitted.

The reflection-type color liquid crystal display device of the third embodiment is the same as that of the first embodiment except for the points of: making the first substrate 1a thinner in thickness than the second substrate 2a; the provision of color filter 7 on first electrodes 3 of the first substrate 1a; and the use of a typical uniaxial-stretching-type film as a retardation film 18.

An STN liquid crystal cell 22 of this reflection-type color liquid crystal display device has nematic liquid crystal 6, which is aligned at a left-handed twist angle of 225°, sandwiched between a first substrate 1a and a second substrate 2a as shown in FIG. 7.

On the visible side (the upper side) of the second substrate 2a of the STN liquid crystal cell 22, a polarizing film 11 having a transmittance of 46% is placed over the retardation film 18 which is the uniaxial-stretching-type and has a retardation value R of 0.55 μm.

In the third embodiment, the first substrate 1a is made to be 0.4 μm in thickness, which is thinner than the first substrate 1 in the first embodiment. Accordingly, color mixture due to incident light in a slanting direction is further reduced, thereby obtaining the chroma more excellent than the first embodiment. Incidentally, since the thickness of the second substrate 2a exerts no influence upon display performance, due to productivity and cost considerations, it is made to be 0.7 mm in thickness. The thickness of the first substrate 1a is made thinner than that of the second substrate 2a as described above, thereby providing an excellent reflection-type color liquid crystal display device without decreasing productivity.

Moreover, the color filter 7 is formed directly on the first electrodes 3, whereby the protection film 8 used in the first and second embodiments becomes unnecessary. It should be noted that when the color filter 7 is provided on the first electrodes 3, part of a driving signal applied to the first electrodes 3 is lost and the contrast lowers.

For this reason, in a transmission-type color liquid crystal display device, it is necessary to increase the permittivity of the color filter 7 or to make thinner the thickness thereof less than 1 μm. However, this embodiment uses the color filter 7 having a thickness of 0.4 μm which is very thin with little loss of an applied signal, thus obtaining a display with high contrast by using a driving signal having a frame frequency of 120 Hz.

The retardation film 18 is the typical uniaxial-stretching-type at low cost and the aforesaid refractive index satisfies the condition of nx>ny=nz. Therefore, the viewing angle characteristic thereof becomes lower than that of the Z-type retardation film 12 used in the first embodiment, but excellent colors can be obtained by making the thickness of the first substrate 1a to be 0.4 mm which is thinner than that of the first embodiment.

In this embodiment, the reflection-type color liquid crystal display device comprises the bright polarizing film 11, the uniaxial-stretching-type retardation film 18, the first substrate 1a thinner than the second substrate 2a, the STN liquid crystal cell 22 with the color filter 7 provided on the first electrodes 3 of the first substrate 1a, and the reflection-type polarizing film 14, and the brightness and shutter performance thereof are optimized. It is driven at a frame frequency ranging from 100 Hz to 200 Hz, thereby providing a reflection-type color liquid crystal display device with high contrast, high brightness and high chroma at further lower cost.

Modification of the Third Embodiment

Though the color filter 7 is formed on the first electrodes 3 of the first substrate 1a in this embodiment, the similar reflection-type color display device can be obtained even if the color filter 7 is formed on second electrodes 4 of the second substrate 2a.

In this embodiment, a glass substrate having a thickness of 0.4 mm is used for the first substrate 1a, and the thinner the thickness of the first substrate 1a, the more excellent colors can be obtained. However, since the workability deteriorates if it is too thin, it is preferable in a range from 0.1 mm to 0.5 mm. A plastic substrate such as polyethylene terephthalate (PET) may be used as a material.

Fourth Embodiment

Next, the fourth embodiment of the reflection-type color liquid crystal display device according to the present invention will be described with reference to FIG. 11 to FIG. 14.

Figure 11:
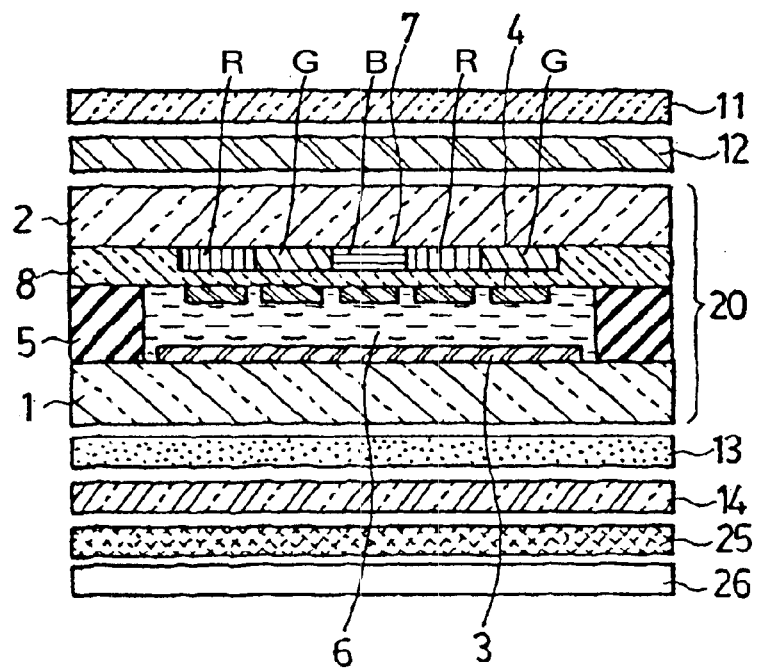
FIG. 11 is a schematic sectional view showing the structure of a fourth embodiment of the reflection-type (transflective) color liquid crystal display device according to the present invention.
Figure 12:
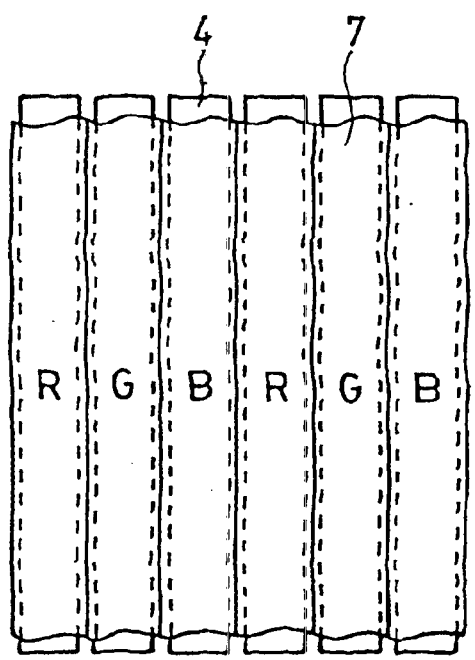
FIG. 12 is a plane view showing shapes of a color filter and second electrodes in FIG. 11.

FIG. 11 is a schematic sectional view, similar to FIG. 1, showing the structure of the reflection-type (transflective) color liquid crystal display device. FIG. 12 is a plane view showing the shapes of its color filter and second electrodes. The same reference numerals are given to components in these drawings corresponding to those in FIG. 1.

Figure 13:
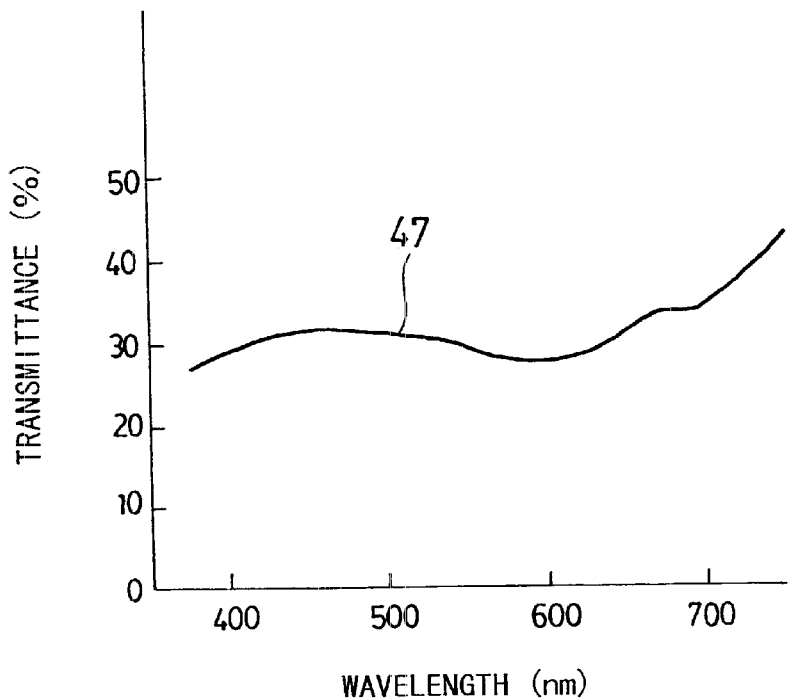
FIG. 13 is a curved-line graph showing a transmittance characteristic of a translucent-type light absorbing layer used in the fourth to the sixth embodiment of the present invention.
Figure 14:
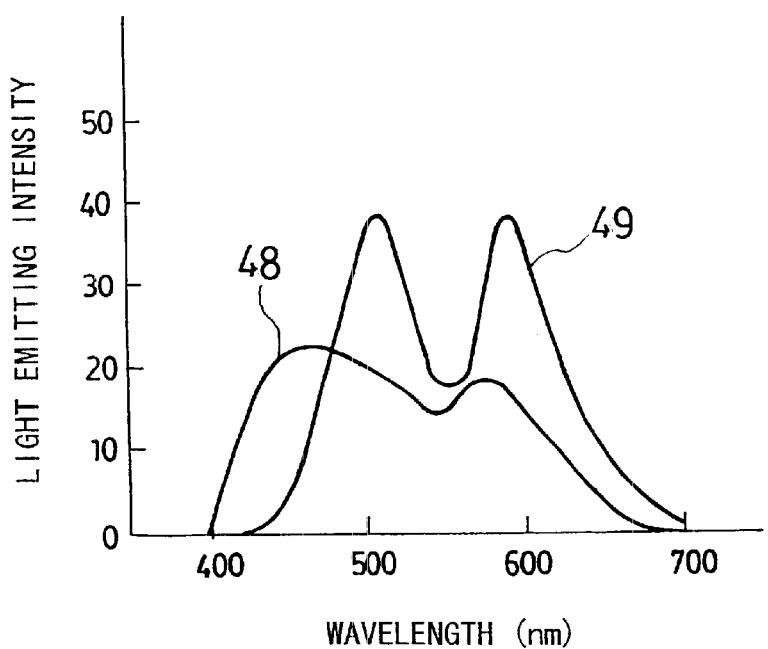
FIG. 14 is a curved-line graph showing emission spectrums of backlights used in the fourth to the sixth embodiment of the present invention.

FIG. 13 is a curved-line graph showing a transmittance characteristic of a translucent-type light absorbing layer used in this embodiment. FIG. 14 is a curved-line graph showing emission spectrum of a backlight.

An STN liquid crystal cell 20 in this reflection-type (transflective) color liquid crystal display device has the same structure as that in the first embodiment shown in FIG. 1, but the thickness of the color filter 7 is made to be 0.3 $\mu$m.

On the other side (the outside) of the visible side of a first substrate 1 of the STN liquid crystal cell 20, a diffusing layer 13, a reflection-type polarizing film 14, a translucent-type light absorbing layer 25, and a backlight 26 are arranged in order. It is the same as the first embodiment that a polarizing film 11 having a transmittance of about 46% and a thickness of about 200 $\mu$m is disposed on the visible side of a second substrate 2 over a retardation film 12 having a retardation value Rf of 55 $\mu$m.

In this embodiment, polyethylene terephthalate (hereinafter referred to as "PET") film having a thickness of 20 $\mu$m to which a black dye is applied is disposed by attaching on the rear face of the reflection-type polarizing film 14 with an adhesive as the translucent-type light absorbing layer 25. The spectral characteristic of the translucent-type light absorbing layer 25 is shown by a curved line 47 in FIG. 13. It shows a flat transmittance in a range from a wavelength of 400 nm to a wavelength of 650 nm, and the average transmittance of all wavelengths is about 30%.

A side-light-type backlight in which a light guide plate having a thickness of 3 mm is combined with a three-wavelength-type fluorescent tube of the straight-tube-type is used as the backlight 26. By using the three-wavelength-type fluorescent tube, high intensity can be obtained, so that the chroma is further improved during transmission illumination.

The color filter 7 consists of three colors of red filters R, green filters G and blue filters B which are formed into vertical stripes as shown in FIG. 12. The width of each color filter is formed wider than that of a second electrode 4 so as not to produce a gap. If a gap is produced in the color filter 7, the display becomes bright due to the increase of incident light, but it is not preferable that the degree of purity of colors decreases because white light mixes into the display colors.

The color filter 7 is preferably as high in maximum transmittance as possible to improve brightness and the maximum transmittance of each color is preferably 80% or more and most preferably 90% or more. Moreover, it is necessary that the minimum transmittance in spectrum is increased to be 20% to 50%.

There are various methods of forming the color filter 7: pigment dispersion, dyeing, printing, transcription, electro-deposition and the like. It is the most preferable to take the pigment dispersion method by which a pigment is dispersed in an acrylic or PVA photoresist because of its high heat resistance temperature and high purity of colors.

In order to obtain the color filter having a high transmittance as described above, in this embodiment, a thin color filter having a thickness less than 0.3 $\mu$m is formed by applying a color resist made of 20% to 30% of pigment in a photoresist on the second substrate 2 with a spinner and patterning it through an exposing process and a developing process.

The spectrums of the color filter 7 are shown in FIG. 8. It should be noted that the maximum transmittances of the color filter 7 are made in such a manner to be an order of a blue filter B>a green filter G>a red filter R, thereby improving the balance of colors and whiteness during OFF.

The positional relations between components in this reflection-type color liquid crystal display device in this embodiment are also the same as those in the first embodiment described with FIG. 2 and FIG. 3, therefore the description thereof is omitted.

The operation and effects in the reflection-type display by ambient light are the same as those in the first embodiment, therefore the descriptions thereof are also omitted.

Next, a case where the backlight 26 is turned on will be described. When the backlight 26 is lit in a dark place such as at night, the light of the backlight 26 after passing through the translucent-type light absorbing layer passes through the reflection-type polarizing film 14, the diffusing layer 13, the STN liquid crystal cell 20, the retardation film 12, and the polarizing film 11 to display white. On the other hand, the linearly polarized light in a reflection axis of the reflection-type polarizing film 14 displaying white does not pass through during reflection illumination, resulting in a black display. Consequently, the display becomes reverse display between the time of reflection illumination and the time of transmission illumination by a backlight, in which the relation between white and black is reversed.

So, a data signal applied to the liquid crystal display device is reversed during lighting of the backlight 26, whereby the reverse display is solved and a transmission-type color display of normal colors can be obtained. Accordingly, the liquid crystal display device becomes the transmission-type even at night by lighting of the backlight 26, which enables recognition of the display.

The higher the transmittance of the translucent-type light absorbing layer 25, the better the brightness during lighting of the backlight 26 becomes. Conversely, the contrast of the reflective display by ambient light lowers while the backlight 26 is not lit. The average transmittance of the translucent-type light absorbing layer 25 is appropriate from 20% to 60%, preferably from 30% to 50% by experiment. In this embodiment, by using a translucent-type light absorbing layer 25 having an average transmittance of 30% shown by a curved line 47 in FIG. 13, an excellent contrast can be obtained when it is used as the reflection-type, and brightness when used as the transmission-type is also good.

In this embodiment, the reflection-type (transflective) color liquid crystal display device comprises the polarizing film 11, the Z-type retardation film 12, the STN liquid crystal cell 20, the reflection-type polarizing film 14, the translucent-type light absorbing layer 25, and the backlight 26. Accordingly, a reflection-type (transflective) color liquid crystal display device which can perform a display with high contrast and high chroma by using ambient light in a bright place and a bright transmission-type color display even in a dark place by lighting of the backlight 26, can be provided.

Modification of the Fourth Embodiment

In this embodiment, the STN liquid crystal cell 20 with Rs=0.84 μm at a twist angle of 225° is used as an STN liquid crystal cell. However, even if it is a liquid crystal display device with Rs=0.7 to 1.0 at a twist angle of 180° to 270°, the similar reflection-type (transflective) color liquid crystal display device can be realized by optimizing arrangement-angles of the polarizing film 11, the retardation film 12, and the reflection-type polarizing film 14.

Though, the STN liquid crystal cell is used in this embodiment, the similar reflection-type (transflective) color liquid crystal display device can be naturally obtained with even a twisted nematic (TN) liquid crystal cell having a twist angle of about 900. The retardation film 12 is unnecessary in a case of the TN liquid crystal cell. However, an active-matrix reflection-type color liquid crystal display device including active elements such as TFTs or MIMs is preferable in a case where a large screen is displayed.

Three color filters of red, green, and blue are used as the color filter 7 in this embodiment. Moreover, even with three color filters of cyan, yellow, and magenta, the similar bright color display can be realized.

Fifth Embodiment

Figure 15:
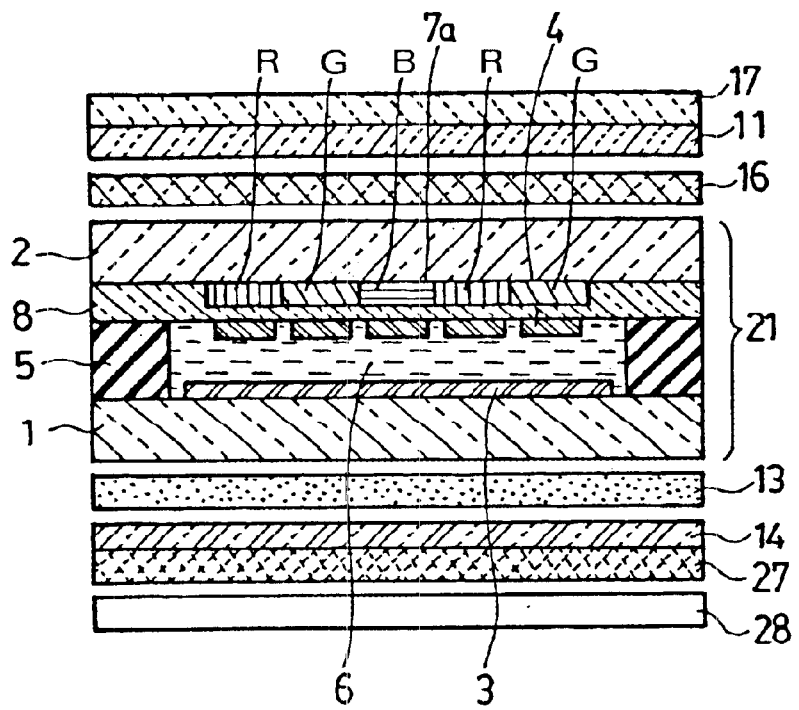
FIG. 15 is a schematic sectional view showing the structure of a fifth embodiment of the reflection-type (transflective) color liquid crystal display device according to the present invention.

Next, the fifth embodiment of the reflection-type color liquid crystal display device according to the present invention will be described with reference to FIG. 14 and FIG. 15.

The reflection-type (transflective) color liquid crystal display device differs from that of the fourth embodiment in the points of: the use of a twisted retardation film 16 in place of the retardation film 12 in the reflection-type color liquid crystal display device according to the fourth embodiment; the difference in twist angle of an STN liquid crystal cell 21; the provision of a non-reflection layer 17 on the surface of a polarizing film 11; the difference in thickness of a color filter 7a; and the difference in kind of a translucent-type light absorbing layer 27 and a backlight 28.

The STN liquid crystal cell 21 of this reflection-type (transflective) color liquid crystal display device has nematic liquid crystal 6, which is aligned at a left-handed twist angle of 240°, sandwiched between a first substrate 1 and a second substrate 2.

The color filter 7a consists of three colors of red filters R, green filters G, and blue filters B with a thickness of 1 μm provided by the pigment dispersion method, which are provided on the inner surface of the second substrate 2 and covered by a protection film 8 with a thickness of 2 μm made of an acrylic material. The remaining structure in the STN liquid crystal cell 21 is the same as that in the second embodiment shown in FIG. 4.

On the other side (the outside) of the visible side of the first substrate 1 of the STN liquid crystal cell 21, a diffusing layer 13, a reflection-type polarizing film 14, the translucent-type light absorbing layer 27, and the backlight 28 made of a white light emitting electro-luminescent (EL) film are arranged in order.

It is the same as the second embodiment shown in FIG. 4 that the polarizing film 11 having a transmittance of 46% and coated with the non-reflection layer 17 is disposed over a twisted retardation film 16 on the outside of the second substrate 2.

The translucent-type light absorbing layer 27 is formed by printing with gray ink, which is a mixture of fluorescent white ink made by mixing a fluorescent white dye in a base with black ink made by mixing a black dye in a base, on the rear face of the reflection-type polarizing film 14 in such a manner to have a transmittance of about 40%. It is difficult to print with black ink thin and evenly so as to have a transmittance of about 40%. Thick printing with the gray ink as in this embodiment enables the formation of the translucent-type light absorbing layer 27 with even transmittance.

The thickness of the translucent-type light absorbing layer 27 formed with this ink is several μm in thickness, which can be made thinner than the plastic film used in the fourth embodiment. Fluorescent ink and black ink made by mixing dyes in bases are used here, and it is, of course, possible to use fluorescent ink and black ink made by mixing fine-grained pigments in bases.

The color filter 7a consists of three colors of red filters R, green filters G, and blue filters B formed into vertical stripes the same as those used in the fourth embodiment shown in FIG. 12.

However, the concentration of pigments is made thinner and a color resist of a photoresist containing about 10% of pigment is used, whereby forming the color filter 7a having a maximum transmittance of 90% or more and a minimum transmittance of about 40% in spectrum in spite of a thickness of about 1.0 μm. The use of the color filter 7a is preferable for obtaining its stable shape, because the adherence of the color filter to the second substrate 2 is better than that of the color filter having a thickness of about 0.3 μm used in the fourth embodiment, thus avoiding a partial peel-off defect of the color filter or narrowing of the width of the color filter due to over-etching.

As the backlight 28, an EL film having a thickness of about 300μm in which blue light emitting elements, green light emitting elements, and orange light emitting elements are mixed to emit white light is used. The emission spectrum when the EL film is applied with a driving voltage of 50 V at 500 Hz is shown by a curved line 48 in FIG. 14. As is clear from the drawing, light in a wide range of a wavelength from 400 nm to 700nm is emitted, consequently, a white light emitting color can be obtained.

The liquid crystal display device can be made thinner than the case of using a backlight of the fluorescent-tube-type having a thickness of several mm used in the fourth embodiment since the EL film is thin in thickness, about 300μm, therefore it is more preferable as a display device for a portable information processing device.

Since this embodiment is provided with the translucent-type light absorbing layer 27 and the backlight 28, lighting of the backlight 28 enables recognition of the display even at night. However, in regard to light of the backlight 28, since the linearly polarized light in a transmission axis of the reflection-type polarizing film 14 passes through and the linearly polarized light in a reflection axis thereof does not pass through, resulting in reverse display in which the relation between white and black is reversed. So, a data signal applied to the liquid crystal display device is reversed during lighting of the backlight 28, whereby a normal color display can be obtained.

In this embodiment, the reflection-type (transflective) color liquid crystal display device comprises the polarizing film 11, the twisted retardation film 16, the STN liquid crystal cell 21, the reflection-type polarizing film 14, the translucent-type light absorbing layer 27 formed by printing with the gray ink made by mixing black ink in fluorescent white ink, and the backlight 28 of an EL film emitting white color. Thereby, a reflection-type color liquid crystal display device which can perform a display with high contrast and high chroma by using ambient light in a bright place and a bright transmission-type color display in a dark place by lighting of the backlight 28, can be provided.

Modification of the Fifth Embodiment

In this embodiment, the STN liquid crystal cell 21 with Rs=0.84 μm at a twist angle Ts=240° is used as an STN liquid crystal cell. However, even if it is a liquid crystal display device with Rs=0.7 to 1.0 at a twist angle of 180° to 270°, the similar reflection-type color liquid crystal display device can be realized by optimizing arrangement-angles of the polarizing film 11, the twisted retardation film 16, and the reflection-type polarizing film 14.

Though, the STN liquid crystal cell is used in this embodiment, the same reflection-type (transflective) color liquid crystal display device can be naturally obtained with even a twisted nematic (TN) liquid crystal cell having a twist angle of about 90°. The twisted retardation film 16 is unnecessary in a case of the TN liquid crystal cell. However, an active-matrix reflection-type color liquid crystal display device including active elements such as TFTs or MIMs is preferable in a case where a large screen is displayed.

In this embodiment, a liquid crystal polymer film, of which the twisted state is fixed at room temperature, is used as the twisted retardation film 16. However, a temperature-compensation-type twisted retardation film, in which part of liquid crystal molecules are only bound together into polymer molecules in a chain state and Rc thereof varies with temperature, is used, thereby obtaining a more excellent reflection-type (transflective) color liquid crystal display device of which the brightness and contrast at high temperatures are improved.

Moreover, as the backlight 28, an EL film for emitting white light, which is made by mixing blue light emitting elements, green light emitting elements, and orange light emitting elements, is used in this embodiment. It is also possible to use an EL film for emitting white light made by printing with fluorescent orange ink, in which a fluorescent dye or a fluorescent pigment is dispersed in a base, on the surface of an EL film for emitting green light, or by mixing fluorescent orange ink into green light emitting elements.

A curved line 49 in FIG. 14 shows the emission spectrum when a driving voltage of 50 V at 500 Hz is applied to an EL film made by printing fluorescent orange ink on the surface of an EL film for emitting green light. By controlling the print concentration of the fluorescent orange ink, the balance between a green emission spectrum having a wavelength of about 510 nm and an orange emission spectrum having a wavelength of about 600 nm excited by green light of light emitting elements can be struck, so that an excellent white light emission can be obtained. Moreover, it is also possible to use fluorescent red ink, fluorescent yellow ink, or fluorescent pink ink in place of fluorescent orange ink.

Though the translucent-type light absorbing layer 27 is formed by printing on the rear face of the reflection-type polarizing film 14 in this embodiment, almost the same effects can be obtained even if it is printed on the surface of the backlight 28.

Sixth Embodiment

Next, the sixth embodiment of the reflection-type color liquid crystal display device according to the present invention will be described with reference to FIG. 16.

The structure of the reflection-type (transflective) color liquid crystal display device of the sixth embodiment is the same as that of the fourth embodiment except for the following points. The thickness of a first substrate 1a is made thinner than that of a second substrate 2a. A color filter 7b is formed on the first substrate 1a. A translucent-type light absorbing layer 29 is formed by printing with ink made by mixing fluorescent blue ink, fluorescent green ink, fluorescent red ink, and black ink, on an EL film, that is a backlight 28. A typical uniaxial-stretching-type retardation film is used as a retardation film 18.

Figure 16:
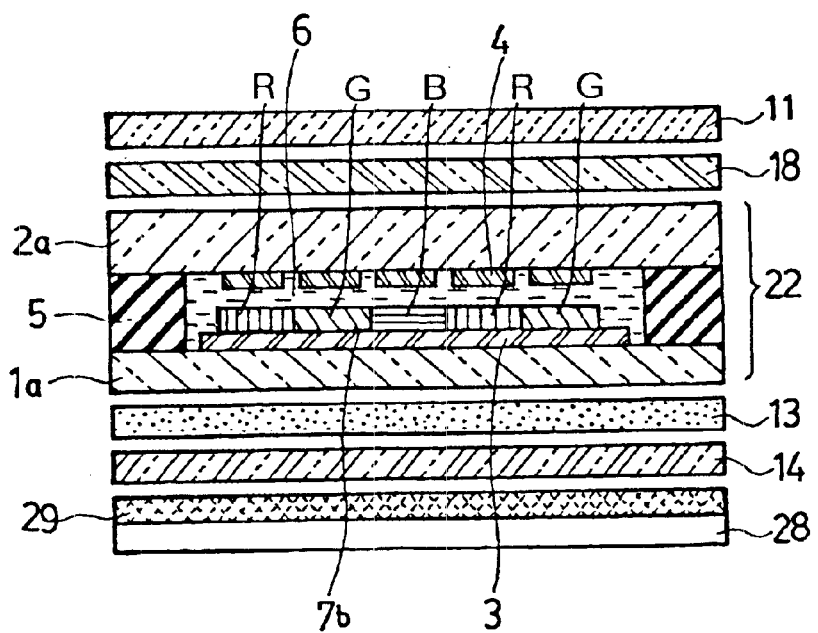
FIG. 16 is a schematic sectional view showing the structure of a sixth embodiment of the reflection-type (transflective) color liquid crystal display device according to the present invention.

The STN liquid crystal cell 22 in this reflection-type (transflective) color liquid crystal display device has, as shown in FIG. 16, nematic liquid crystal 6, which is aligned at a left-handed twist angle of 225°, sandwiched between the first substrate 1a and the second substrate 2a. The first substrate 1a made of a glass plate having a thickness of 0.4 mm and provided with first electrodes 3 made of ITO on which the color filter 7b having a thickness of 0.3 μm is formed by the pigment dispersion method and the second substrate 2a made of a glass plate with a thickness of 0.7 mm and provided with second electrodes 4 made of ITO, are bonded together with a sealant 5.

A diffusing layer 13 is disposed outside the first substrate 1a of the STN liquid crystal cell 22, a reflection-type polarizing film 14 is disposed outside the diffusing layer 13, and the backlight 28 made of white light emitting EL film printed with the translucent-type light absorbing layer 29 is disposed outside the reflection-type polarizing film 14. On the visible side of the second substrate 2a, the retardation film 18 of the uniaxial-stretching-type having a retardation value Rf of 0.55 μm is disposed and a polarizing film 11 having a transmittance of 46% is disposed outside the retardation film 18.

The backlight 28, which is the same as that used in the fifth embodiment, is an EL film having a thickness of 0.3 mm in which blue light emitting elements, green light emitting elements, and orange light emitting elements are mixed for emitting white light.

The translucent-type light absorbing layer 29 is formed by printing with gray ink, in which black ink is mixed in fluorescent blue ink, fluorescent green ink, and fluorescent red ink made by dispersing fluorescent dyes in a base, on the surface of the backlight 28 so as to have a transmittance of about 40%. It is difficult to print with black ink thin and evenly so as to have a transmittance of about 40%. Accordingly, thick printing with the gray ink as in this embodiment enables the formation of the translucent-type light absorbing layer 29 with even transmittance.

The thickness of the translucent-type light absorbing layer 29 formed with this ink is several μm in thickness, which can be made thinner than the plastic film used in the fourth embodiment. Fluorescent ink and black ink made by mixing dyes in bases are used here, and it is, of course, possible to use fluorescent ink and black ink made by mixing fine-grained pigments in bases.

By making the thickness of the first substrate 1a to be 0.4 mm which is thinner than that of the first embodiment, color mixture due to incident light in a slanting direction is further decreased, thereby obtaining the chroma more excellent than in the first embodiment. Incidentally, since the thickness of the second substrate 2a exerts no influence upon display performance due to productivity and cost considerations, it is made to be 0.7 mm in thickness. Only the thickness of the first substrate 1a is made thin, thereby providing an excellent reflection-type (transflective) color liquid crystal display device without decreasing productivity.

The color filter 7b consists of three colors of red filters R, green filters G, and blue filters B formed into vertical stripes which are the same shapes as the color filters used in the fourth embodiment.

The color filter 7b is formed directly on the first electrodes 3, thereby the protection film 8 used in the fourth embodiment becomes unnecessary. Accordingly, when the color filter 7b is provided on the first electrodes 3, part of a driving signal applied to the first electrodes 3 is lost and the contrast lowers, but the cost can be reduced.

The retardation film 18 is the typical uniaxial-stretching-type and the refractive index thereof satisfies the condition of nx>ny=nz. Therefore, the viewing angle characteristic thereof becomes lower than that of the Z-type retardation film 12 used in the first embodiment, but the cost can be reduced.

Since this embodiment is also provided with the translucent-type light absorbing layer 29 formed by printing and the backlight 28, lighting of the backlight 28 enables recognition of the display even at night. However, in regard to light of the backlight 28, since the linearly polarized light in a transmission axis of the reflection-type polarizing film 14 passes through and the linearly polarized light in a reflection axis thereof does not pass through, resulting in reverse display in which the relation between white and black is reversed. So, a data signal applied to the liquid crystal display device is reversed during lighting of the backlight 28, whereby a normal color display can be obtained.

In this embodiment, the reflection-type color liquid crystal display device comprises the polarizing film 11, the uniaxial-stretching-type retardation film 18, the STN liquid crystal cell 22, the reflection-type polarizing film 14, the translucent-type light absorbing layer 29 formed by printing with ink made by mixing fluorescent blue ink, fluorescent green ink, fluorescent red ink, and black ink, and the backlight 28 of an EL film emitting white color. Thereby, a reflection-type color liquid crystal display device which can perform a reflection-type color display with high contrast and high chroma by using ambient light in a bright place and a bright transmission-type color display in a dark place by lighting of the backlight 28, can be provided.

Modification of the Sixth Embodiment

Though the color filter 7b is formed on the first electrodes 3 of the first substrate 1a in this embodiment, the similar reflection-type (transflective) color display device can be obtained even if the color filter 7b is formed on the second electrodes 4 of the second substrate 2a.

In this embodiment, a glass substrate having a thickness of 0.4 mm is used for the first substrate 1a, and the thinner the thickness of the first substrate 1a is, the more excellent colors can be obtained. However, since the workability deteriorates if it is too thin, it is preferable in a range from 0.1 mm to 0.5 mm. The similar reflection-type (transflective) color display device can be obtained even if a plastic substrate such as polyethylene terephthalate (PET) is used as a material.

Moreover, as the backlight 28, an EL film for emitting white light, which is made by mixing blue light emitting elements, green light emitting elements and orange light emitting elements, is used in this embodiment. It is also possible to use an EL film for emitting white light made by printing with fluorescent orange ink, in which a fluorescent dye or a fluorescent pigment is dispersed in a base, on the surface of an EL film for emitting green light, or by mixing fluorescent orange ink into green light emitting elements. Moreover, it is also possible to use fluorescent red ink, fluorescent yellow ink, or fluorescent pink ink in place of the fluorescent orange ink.

Furthermore, in this embodiment, the translucent-type light absorbing layer 29 is formed by printing with the gray ink made by mixing fluorescent blue ink, fluorescent green ink, fluorescent red ink, and black ink. It can also be formed by printing with gray ink made by mixing white ink in fluorescent cyan ink, fluorescent yellow ink, and fluorescent magenta ink.

Though the translucent-type light absorbing layer 29 is formed by printing on the surface of the backlight 28 in this embodiment, almost the same effects can be obtained even if it is printed on the rear face of the reflection-type polarizing film 14.

INDUSTRIAL APPLICABILITY

According to the present invention, a reflection-type (transflective) color liquid crystal display device with a bright display, high contrast and excellent colors, can be provided. Moreover, a translucent-type light absorbing layer is disposed in place of the light absorbing layer and a backlight is provided, thereby a bright color display with excellent contrast can be realized even in a dark place by lighting of the backlight.

This reflection-type color liquid crystal display device can be employed to display devices such as various kinds of electronic devices and the like, and it is the most suitable for performing color displays of various portable devices such as a personal digital assistant (PDA), a portable telephone, a wrist watch and the like.

What is claimed is:

1. A reflection-type color liquid crystal display device, comprising:

an STN liquid crystal cell having nematic liquid crystal, which is aligned at a twist angle of 180° to 270°, sandwiched between a transparent first substrate having first electrodes and a transparent second substrate having second electrodes, said first electrodes and said second electrodes opposing to each other across said nematic liquid crystal, and said first substrate or said second substrate being provided with a color filter of a plurality of colors;

an absorption-type polarizing film which has a transmission axis and an absorption axis, placed on the visible side of said second substrate;

a retardation film placed between said absorption-type polarizing film and said second substrate; and a diffusing layer, a reflection-type polarizing film which has a transmission axis and a reflection axis, and a light absorbing layer absorbing almost all incident light, which are arranged in order on the other side of the visible side of said first substrate, said light absorbing layer containing fluorescent material, wherein conditions of nx>nz>ny of the retardation film are satisfied, where nx is the refractive index in a stretching direction of said retardation film, ny is the refractive index in a direction orthogonal to the stretching direction, and nz is the refractive index in a thickness direction.

2. The reflection-type color liquid crystal display device according to claim 1, wherein a value of a difference ΔR=Rs−Rf ranges from 0.27 μm to 0.35 μm, where Rs is a Δnd which is the product of a difference Δn in the birefringence of nematic liquid crystal of said STN liquid crystal cell and a cell gap d, and Rf is a retardation value of said retardation film.

3. A reflection-type color liquid crystal display device, comprising:
    an STN liquid crystal cell having nematic liquid crystal, which is aligned at a twist angle of 180° to 270°, sandwiched between a transparent first substrate having first electrodes and a transparent second substrate having second electrodes, said first electrodes and said second electrodes opposing to each other across said nematic liquid crystal, and said first substrate or said second substrate being provided with a color filter of a plurality of colors;
    an absorption-type polarizing film which has a transmission axis and an absorption axis, placed on the visible side of said second substrate;
    a twisted retardation film placed between said absorption-type polarizing film and said second substrate; and
    a diffusing layer, a reflection-type polarizing film which has a transmission axis and a reflection axis, and a light absorbing layer absorbing almost all incident light, which are arranged in order on the other side of the visible side of said first substrate, said light absorbing layer containing fluorescent material.

4. The reflection-type color liquid crystal display device according to claim 3, wherein a value of a difference $\Delta T=|Ts|-|Tc|$ in absolute value of each twist angle ranges from 10° to 30° and a value of $\Delta R=Rs-Rc$ ranges from 0.15 $\mu$m to 0.30 $\mu$m, where Rs is a $\Delta nd$ which is the product of a difference $\Delta n$ in the birefringence of nematic liquid crystal of said STN liquid crystal cell and a cell gap d, Ts is a twist angle of said STN liquid crystal cell, Rc is a retardation value of said twisted retardation film, and Tc is a twist angle of said twisted retardation film.

5. A reflection-type color liquid crystal display device, comprising:
    an STN liquid crystal cell having nematic liquid crystal, which is aligned at a twist angle of 180° to 270°, sandwiched between a transparent first substrate having first electrodes and a transparent second substrate having second electrodes, said first electrodes and said second electrodes opposing to each other across said nematic liquid crystal, and said first substrate or said second substrate being provided with a color filter of a plurality of colors;
    an absorption-type polarizing film which has a transmission axis and an absorption axis, placed on the visible side of said second substrate;
    a retardation film placed between said absorption-type polarizing film and said second substrate; and
    a diffusing layer, a reflection-type polarizing film which has a transmission axis and a reflection axis, and a light absorbing layer absorbing almost all incident light, which are arranged in order on the other side of the visible side of said first substrate, said light absorbing layer containing fluorescent material,
    wherein conditions of nx>ny=nz of the retardation film are satisfied, where nx is the refractive index in a stretching direction of said retardation film, ny is the refractive index in a direction orthogonal to the stretching direction, and nz is the refractive index in a thickness direction, and
    wherein a value of a difference DR=Rs–Rf ranges from 0.27 mm to 0.35 mm, where Rs is a Dnd which is the product of a difference Dn in the birefringence of nematic liquid crystal of said STN liquid crystal cell and a cell gap d, and Rf is a retardation value of said retardation film.

6. The reflection-type color liquid crystal display device according to claim 1, wherein said color filter has a maximum transmittance of 80% or more and a minimum transmittance of 20% to 50% due to its spectral characteristics.

7. The reflection-type color liquid crystal display device according to claim 3, wherein said color filter has a maximum transmittance of 80% or more and a minimum transmittance of 20% to 50% due to its spectral characteristics.

8. The reflection-type color liquid crystal display device according to claim 5, wherein said color filter has a maximum transmittance of 80% or more and a minimum transmittance of 20% to 50% due to its spectral characteristics.

9. The reflection-type color liquid crystal display device according to claim 1, wherein the thickness of said first substrate is thinner than that of said second substrate.

10. The reflection-type color liquid crystal display device according to claim 3, wherein the thickness of said first substrate is thinner than that of said second substrate.

11. The reflection-type color liquid crystal display device according to claim 5, wherein the thickness of said first substrate is thinner than that of said second substrate.

12. A reflection-type color liquid crystal display device, comprising:
    an STN liquid crystal cell having nematic liquid crystal, which is aligned at a twist angle of 180° to 270°, sandwiched between a transparent first substrate having first electrodes and a transparent second substrate having second electrodes, said first electrodes and said second electrodes opposing to each other across said nematic liquid crystal, and said first substrate or said second substrate being provided with a color filter of a plurality of colors;
    an absorption-type polarizing film which has a transmission axis and an absorption axis, placed on the visible side of said second substrate;
    a retardation film placed between said absorption-type polarizing film and said second substrate; and
    a diffusing layer, a reflection-type polarizing film which has a transmission axis and a reflection axis, a translucent light absorbing layer, and a backlight, which are arranged in order on the other side of the visible side of said first substrate, said translucent light absorbing member containing fluorescent material.

13. The reflection-type color liquid crystal display device according to claim 12, wherein conditions of nx>nz>ny of the retardation film are satisfied, where nx is the refractive index in a stretching direction of said retardation film, ny is the refractive index in a direction orthogonal to the stretching direction, and nz is the refractive index in a thickness direction.

14. A reflection-type color liquid crystal display device, comprising:
    an STN liquid crystal cell having nematic liquid crystal, which is aligned at a twist angle of 180° to 270°, sandwiched between a transparent first substrate having first electrodes and a transparent second substrate having second electrodes, said first electrodes and said second electrodes opposing to each other across said nematic liquid crystal, and said first substrate or said second substrate being provided with a color filter of a plurality of colors;
    an absorption-type polarizing film which has a transmission axis and an absorption axis, placed on the visible side of said second substrate;

a twisted retardation film placed between said absorption-type polarizing film and said second substrate; and a diffusing layer, a reflection-type polarizing film which has a transmission axis and a reflection axis, a translucent light absorbing layer, and a backlight, which are arranged in order on the other side of the visible side of said first substrate, said translucent light absorbing member containing fluorescent material.

15. The reflection-type color liquid crystal display device according to claim 12, wherein said translucent light absorbing layer is a plastic film dyed with a black dye or a black pigment to have a transmittance of 20% to 60%.

16. The reflection-type color liquid crystal display device according to claim 14, wherein said translucent light absorbing layer is a plastic film dyed with a black dye or a black pigment to have a transmittance of 20% to 60%.

17. The reflection-type color liquid crystal display device according to claim 12, wherein said translucent light absorbing layer is formed by printing with black ink to have a transmittance of 20% to 60% on the rear face of said reflection-type polarizing film or on the front face of said backlight.

18. The reflection-type color liquid crystal display device according to claim 14, wherein said translucent light absorbing layer is formed by printing with black ink to have a transmittance of 20% to 60% on the rear face of said reflection-type polarizing film or on the front face of said backlight.

19. A reflection-type color liquid crystal display device, comprising:

a liquid crystal cell having liquid crystal sandwiched between a transparent first substrate having first electrodes and a transparent second substrate having second electrodes; and a reflection-type polarizing film which has a transmission axis and a reflection axis, and a light absorbing layer absorbing almost all incident light, which are arranged in order on the other side of the visible side of said first substrate, said light absorbing layer containing fluorescent material.

20. The reflection-type color liquid crystal display device according to claim 19, wherein said liquid crystal is nematic liquid crystal aligned at a twist angle of 180° to 270°.

21. The reflection-type color liquid crystal display device according to claim 19, wherein said first substrate or said second substrate of said liquid crystal cell is provided with a color filter of a plurality of colors.

22. The reflection-type color liquid crystal display device according to claim 19, which further comprises:

an absorption-type polarizing film which has a transmission axis and an absorption axis, placed on the visible side of said second substrate; and a retardation film placed between said absorption-type polarizing film and said second substrate.

23. The reflection-type color liquid crystal display device according to claim 22, wherein conditions of nx>nz>ny of the retardation film are satisfied, where nx is the refractive index in a stretching direction of said retardation film, ny is the refractive index in a direction orthogonal to the stretching direction, and nz is the refractive index in a thickness direction.

24. The reflection-type color liquid crystal display device according to claim 22, wherein said retardation film is a twisted retardation film.

25. The reflection-type color liquid crystal display device according to claim 22, wherein conditions of nx>ny=nz of the retardation film are satisfied, where nx is the refractive index in a stretching direction of said retardation film, ny is the refractive index in a direction orthogonal to the stretching direction, and nz is the refractive index in a thickness direction, and wherein a value of a difference DR=Rs−Rf ranges from 0.27 mm to 0.35 mm, where Rs is a Dnd which is the product of a difference Dn in the birefringence of nematic liquid crystal of said liquid crystal cell and a cell gap d, and Rf is a retardation value of said retardation film.

26. A reflection-type color liquid crystal display device, comprising:

a liquid crystal cell having liquid crystal sandwiched between a transparent first substrate having first electrodes and a transparent second substrate having second electrodes; and a reflection-type polarizing film which has a transmission axis and a reflection axis, and a translucent light absorbing layer, which are arranged in order on the other side of the visible side of said first substrate, said translucent light absorbing layer containing fluorescent material.

27. The reflection-type color liquid crystal display device according to claim 26, wherein said liquid crystal is nematic liquid crystal aligned at a twist angle of 180° to 270°.

28. The reflection-type color liquid crystal display device according to claim 26, wherein said first substrate or said second substrate of said liquid crystal cell is provided with a color filter of a plurality of colors.

29. The reflection-type color liquid crystal display device according to claim 26, which further comprises a backlight, which is provided on the other side of the visible side of said translucent light absorbing layer.

30. The reflection-type color liquid crystal display device according to claim 26, which further comprises:

an absorption-type polarizing film which has a transmission axis and an absorption axis, placed on the visible side of said second substrate; and a retardation film placed between said absorption-type polarizing film and said second substrate.

31. The reflection-type color liquid crystal display device according to claim 30, wherein conditions of nx>nz>ny of the retardation film are satisfied, where nx is the refractive index in a stretching direction of said retardation film, ny is the refractive index in a direction orthogonal to the stretching direction, and nz is the refractive index in a thickness direction.

32. The reflection-type color liquid crystal display device according to claim 30, wherein said retardation film is a twisted retardation film.

* * * * *

UNITED STATES PATENT AND TRADEMARK OFFICE
CERTIFICATE OF CORRECTION

PATENT NO. : 6,504,588 B1
DATED : January 7, 2003
INVENTOR(S) : Yasushi Kaneko

It is certified that error appears in the above-identified patent and that said Letters Patent is hereby corrected as shown below:

<u>Drawings,</u>
Change Fig. 1

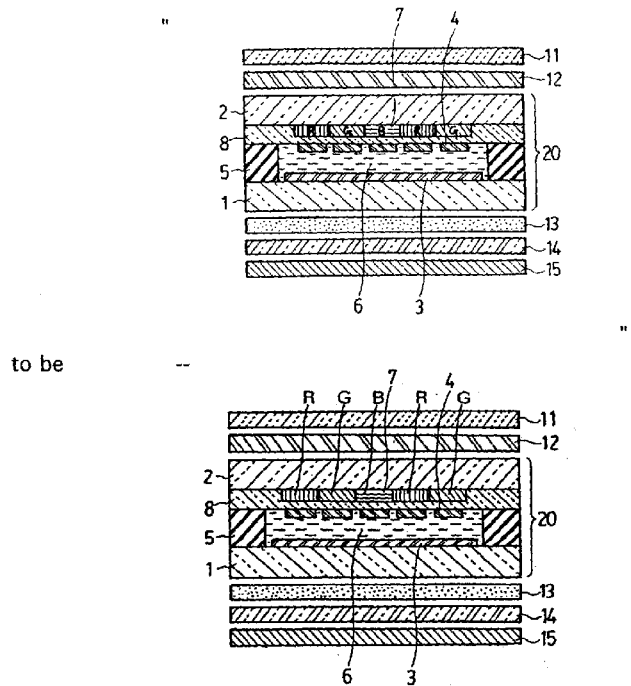

to be --

--

Signed and Sealed this

Fifteenth Day of July, 2003

JAMES E. ROGAN
*Director of the United States Patent and Trademark Office*